Patented Nov. 10, 1942

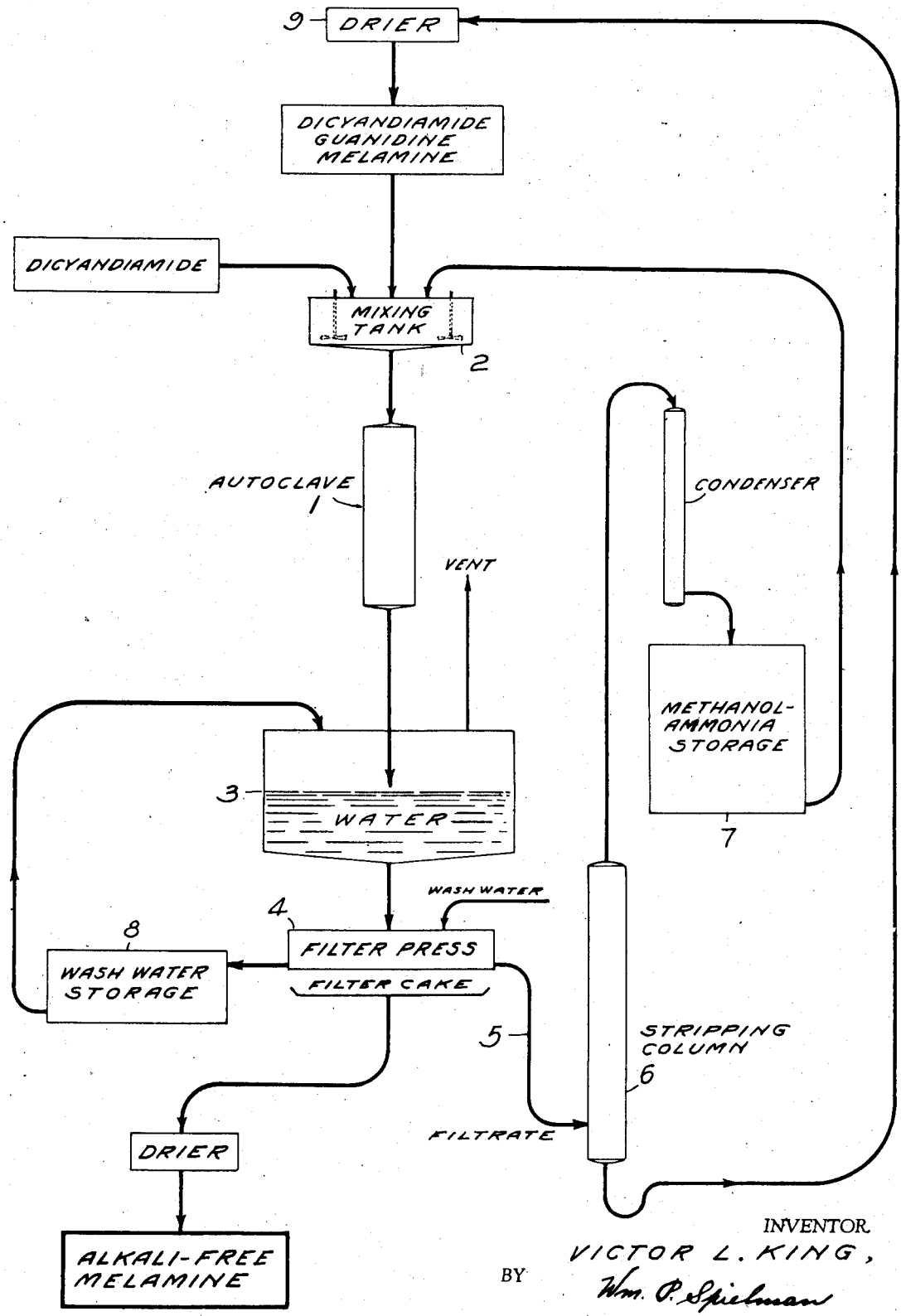

2,301,629

UNITED STATES PATENT OFFICE 2,301,629

MANUFACTURE OF MELAMINE

Victor L. King, Bound Brook, N. J., assignor to American Cyanamid Company, New York, N. Y., a corporation of Maine Application July 10, 1940, Serial No. 344,638

6 Claims. (Cl. 260—248)

This invention relates to the manufacture of melamine by processes which involve the heating of cyanamide or dicyandiamide in a solvent comprising liquid ammonia at high temperatures and pressures. A principal object of the invention resides in the production by such methods of a melamine product which, without recrystallizing or subliming, is especially well suited for the manufacture of resins and clear and haze-free melamine-formaldehyde lacquers.

It is known that a melamine product of high purity can be obtained by heating a mixture of about 1 part of cyanamide or dicyandiamide with from 1-2 parts of liquid ammonia in an autoclave, with or without the addition of anhydrous methanol or other diluents to reduce the autoclave pressure. In ordinary commercial manufacture it has been the practice, after the heating is completed, to discharge the contents of the autoclave through a filter which separates the solid melamine product from the liquid ammonia or other solvent mixture, and then to wash the solids collected on the filter with water. When this procedure is followed it is necessary to recrystallize the resulting melamine product from boiling water, with or without the addition of caustic soda solution, if a pure product is desired.

In many cases the product obtained by simply washing the filter cake from the autoclave charge once or twice with water has analyzed as high as 96-98% melamine. Although the methods of analysis available at the present time are based primarily on the differential solubility of melamine in hot and cold water, and are therefore only accurate within a few percent, there is every indication that a pure melamine is produced by the above process. It is therefore very surprising to find that resins and lacquers made by condensing melamine from this source with formaldehyde are inferior in quality to those prepared from melamine manufactured by other and less efficient processes.

Upon investigating the reasons why melamine prepared by the above described autoclave process is less well suited for resin manufacture than melamine from other sources, I found that the autoclave product exhibited a considerably higher alkalinity upon solution in hot water. Careful investigation has led me to believe that this alkalinity is due to the presence of one or more intermediate conversion products of cyanamide and/or dicyandiamide in the melamine, although it should be understood that my invention is not dependent upon the accuracy of this identification. The intermediate conversion products of cyanamide and dicyandiamide are guanidine, biguanide and guanylurea, and my investigation has led me to believe that small amounts of one or more of these compounds are formed by side reactions during the melamine formation in the autoclave. Whatever the impurities may be, however, they are basic in character, not completely removed from a solid melamine product by ordinary washing of the filter cake, and are a serious detriment to the quality of melamine-formaldehyde lacquers containing them.

My invention relates principally to a modification of the above described autoclave method for preparing melamine which I have found will avoid a product containing the above impurities. My new process will produce a melamine substantially free from guanidine, biguanide and/or guanylurea that can be converted into high-grade melamine-formaldehyde resins and lacquers. I have found that such a melamine product is obtained when the melamine content of the autoclave is washed before it is permitted to collect in the form of a solid cake such as is formed when the contents of the melamine autoclave are discharged upon or through a filter. Apparently the separation of the melamine from the ammonia-methanol mixture or other solvent in the autoclave in the form of a filter cake results in an absorption or adsorption of the alkaline impurities by the solid melamine particles in such a manner as to be extremely difficult or impossible to remove by ordinary washing procedures. By washing the melamine product before the ammonia or ammonia-methanol mixture is completely drained off this adsorption is avoided and a product is obtained which is well suited for lacquer manufacture.

The simplest method of avoiding the initial formation of a cake of solid melamine is to discharge the entire contents of the autoclave directly into a quantity of cold or lukewarm water, or into aqueous solutions or other solvents for the alkaline impurities such as ethyl alcohol or other organic solvents, and this constitutes the preferred procedure in practicing my invention. Other mechanical methods may also be used to discharge the autoclave without cake formation, such as discharging the autoclave mixture into a spray-drying chamber in countercurrent contact with a rising stream of hot or cold gases or discharging a mixture containing melamine and liquid ammonia into a chamber so large that the melamine may settle gradually as a fine powder, it being understood that in either case the product is washed before it is permitted to cake together. As has been stated, the essential factor is the avoidance of a solid cake of unwashed melamine product from the autoclave, and any suitable method may be used to obtain this result.

After the solid content of the autoclave has been discharged into water or other similar liquid media, it is washed by agitation and can then be safely collected on a filter and washed with water or other solvents in the usual manner. Surprising as it may seem, I have found that the step of discharging the entire contents of the autoclave, both solid, liquid and gaseous, directly into a body of water prior to filtration is in itself sufficient to insure the production of a melamine product useful for lacquer manufacture instead of the alkaline product containing guanidine and/or guanylurea that forms resins and lacquers of inferior quality. Once this step has been taken, the usual procedure of filtering, washing the product with water and drying at high temperatures may be followed safely.

The manipulative features of my invention will be illustrated in greater detail with reference to the accompanying drawing, the single figure of which is a flow sheet illustrating diagrammatically a preferred modification thereof. On this flow sheet, 1 indicates diagrammatically the autoclave in which the conversion of dicyandiamide to melamine is carried out. This autoclave preferably consists of a pressure resistant vessel of large capacity equipped with internal heating coils and with an agitator. A charge consisting of a solution of dicyandiamide in about an equal weight of ammonia, with or without the addition of anhydrous methanol or other suitable diluent, is prepared in the mixing tank 2 and charged into the autoclave. A suitable heating medium such as high pressure steam is then passed through the heating coils of the autoclave and the charge is heated at temperatures of 120–220° C., and preferably at 160–200° C., for several hours or until the desired melamine product has been formed.

According to the principles of my invention, the entire autoclave charge is then blown directly into a drowning tank 3, which is a large closed tank in which has been placed a quantity of water sufficient to form a pumpable slurry with the melamine product and preferably also sufficient to dissolve all the ammonia. Suitable cooling means are also preferably provided in this tank, in order that the temperature of its contents may be kept at a sufficiently low temperature to prevent the solution of too much of the melamine. During the heating cycle in the autoclave a second batch of the dicyandiamide-liquid ammonia solution can be prepared in the mixing tank 2, and as soon as the autoclave is discharged this second batch can be pumped in and the autoclave again heated.

In the meantime the slurry in the tank 3 is pumped into the filter press 4 with continuous agitation to prevent sedimentation. The filtrate leaving the filter press through the line 5 is passed to a stripping column 6 while the melamine on the filter cloth, after being washed with fresh water, is charged into a drier and is obtained as a melamine suitable for resin and lacquer manufacture.

It is evident from the flow sheet that this modification of my invention is well suited for the recovery and reuse of all the materials used in the process. The wash water from the filter press can be collected in a wash water storage tank 8 and returned to the drowning tank 3 to receive the next batch of melamine while the filtrate is heated in the stripping column 8 to separate out ammonia or a mixture of ammonia and methanol or other alcohol if a diluent was used in the autoclave. This ammonia or ammonia-alcohol mixture is preferably condensed and collected in a storage tank 7 from which a portion of it is returned to the mixing tank 2 for the preparation of further batches.

The stripped liquor from the base of the column 6 is a solution containing small amounts of melamine dissolved in the drowning tank 3, any unreacted dicyandiamide and all the guanidine, guanylurea or other alkaline by-products that were formed in the autoclave. This liquor is preferably pumped to a drier 9, which may be a steam heated or direct fired vacuum concentrator, in which its content of solid material is recovered. This dried mixture of dicyandiamide, melamine and guanidine or guanylurea may then be added to the mixing tank during the preparation of further charges for the autoclave.

The invention will be illustrated in greater detail by the following specific examples. It should be understood, however, that these examples are given primarily for purposes of illustration and that the invention in its broader aspects is not limited thereto.

*Example 1*

A solution of 4 parts by weight of dicyandiamide in a mixture of 4 parts liquid anhydrous ammonia and 3.2 parts anhydrous methanol was charged into an autoclave, heated to 180° C. during 1 hour and held at this temperature for 1 hour longer. The charge was then cooled to 100° C. and discharged at a pressure of 800 lbs./sq. in. directly into a vessel containing 100 parts of water maintained at a temperature of 40° C. or lower.

The contents of the vessel, which were violently agitated by the pressure discharge, were allowed to settle; the supernatant liquid was decanted and charged into a stripping column for recovery of the ammonia and methanol, and the solid residue was again washed with 67 parts of water. This was decanted off and the resulting granular melamine was sucked free of adhering water on a vacuum filter and dried in an oven at 110° C. The product analyzed

|  | Per cent |
|---|---|
| Melamine | 94.9 |
| Dicyandiamide | 0.6 |
| Cold water insolubles | 4.5 |

No guanidine or guanylurea was found.

126 grams of the above batch of melamine were mixed with 405.5 grams of 37% aqueous formaldehyde solution and 440 grams of anhydrous butanol and the mixture was heated to boiling in a flask fitted with a charging funnel and a condenser. A mixture of butanol and water was distilled off, and further replacements of butanol were added at 15 minute intervals. A total of 1150 grams of butanol were added in this manner during a period of about 2 hours, after which a vacuum was applied and the heating continued until the distillate was anhydrous. A yield of 476 grams of a butylated melamine-formaldehyde lacquer was obtained which was diluted with 154 grams of xylene, mixed with 6.5 grams of diatomaceous earth and filtered. A clear and haze-free lacquer was obtained, indicating that the melamine was free from guanidine and guanylurea.

*Example 2*

Another batch of melamine was prepared exactly as described in Example 1 except that the charge after cooling to 100° C. was discharged through a closed filter vessel containing a fine wire screen. The filter cake which collected on the screen was washed with sufficient water to remove all the ammonia and was then dried in the oven at 110° C.

126 grams of this batch were reacted with 405.5 grams of 37% aqueous formaldehyde and 440 grams of anhydrous butanol under a condenser and a total of 1150 grams of additional butanol were added, the procedure followed being an exact duplication of that followed in Example 1. The product, however, even after dilution with xylene, soon set up to an almost solid, gummy mass and was valueless as a lacquer.

*Example 3*

1465 pounds of dicyandiamide were dissolved in 2637 pounds of alcohol-ammonia solution, analyzing 54% ammonia and 46% methanol. This charge was pumped into a large autoclave and heated to 180–200° C. for several hours at a pressure of 1600–1900 lbs./sq. in.

The autoclave charge was then blown into a quenching tank containing 6000 lbs. of water during a period of about 15 minutes. The solution in the quenching tank was then agitated and cooled by recirculation through a cooler until the temperature was lowered sufficiently to reduce excessive losses of melamine, while retaining dicyandiamide in solution, a temperature range of 40–70° C. being suitable, and was then filtered in a filter press. The mother liquor was passed through a stripping column in which the alcohol and ammonia were recovered and the remaining water was then evaporated. The residue consisting of dicyandiamide, guanidine, and small amounts of melamine was then ready to be reintroduced into the autoclave with the next batch.

The melamine in the filter press was washed with about 6000 lbs. of water which was then placed in the quenching tank to drown the discharge of the next batch of melamine from the autoclave. By reusing the wash water in this manner it was possible to prevent loss of melamine dissolved from the filter press.

After the washing in the filter press was complete the batch was spread out and dried at temperatures of about 100° C. A pure white product was obtained which exhibited a pH in water solution of 7.9 and analyzed 95.3% melamine, 0.6% dicyandiamide and 4.1% insolubles. A butylated melamine-formaldehyde lacquer prepared from this material by the procedure described in Example 1 was clear, haze-free, and of excellent quality.

*Example 4*

0.5% by weight of guanylurea carbonate was added to 126 grams of the batch of melamine described in Example 3, and the mixture was then reacted with aqueous formaldehyde and butanol by the procedure described in Example 1. The product, after dilution with xylene, soon set up to a gummy mass and was of no value as a lacquer, which proves that even small quantities of guanylurea are extremely harmful to the melamine product.

*Example 5*

To 124.75 grams of the batch of melamine described in Example 3 was added 1.25 (1%) grams of guanidine carbonate, and the mixture was then reacted with aqueous formaldehyde and butanol by the procedure described in Example 1. By the time the mixture was nearly dehydrated, as shown by a boiling point of 100° C. at atmospheric pressure, a large part of the resin had precipitated from solution in the butanol. This resinous precipitate would not dissolve in butanol on further dehydration and was of no value as a lacquer.

What I claim is:

1. A process for the manufacture of melamine suitable for lacquer manufacture which comprises heating a member of the group consisting of cyanamide and dicyandiamide in a solvent comprising anhydrous ammonia until a melamine product containing alkaline intermediate conversion products of the type of guanidine, biguanide and guanylurea has been formed and washing this product with a liquid solvent for said impurities which does not dissolve substantial amounts of melamine before it is permitted to collect in the form of a solid cake.

2. A process for the manufacture of melamine suitable for lacquer manufacture which comprises heating a member of the group consisting of cyanamide and dicyandiamide in a solvent comprising anhydrous ammonia until a melamine product containing alkaline intermediate conversion products of the type of guanidine, biguanide and guanylurea has been formed and washing this product with water before it is permitted to collect in the form of a solid cake.

3. A process for the manufacture of melamine suitable for lacquer manufacture which comprises heating a member of the group consisting of cyanamide and dicyandiamide and a solvent comprising anhydrous ammonia in an autoclave until a melamine product containing alkaline intermediate conversion products of the type of guanidine, biguanide and guanylurea has been formed and discharging the contents of the autoclave directly into a body of a liquid solvent for said impurities which does not dissolve substantial amounts of melamine.

4. A process for the manufacture of melamine suitable for lacquer manufacture which comprises heating a member of the group consisting of cyanamide and dicyandiamide and a solvent comprising anhydrous ammonia in an autoclave until a melamine product containing alkaline intermediate conversion products of the type of guanidine, biguanide and guanylurea has been formed and discharging the contents of the autoclave directly into a body of water.

5. A process for the manufacture of melamine which comprises the steps of heating a member of the group consisting of cyanamide and dicyandiamide and a solvent comprising liquid ammonia in an autoclave until a melamine product has been formed, discharging the contents of the autoclave directly into a body of water to dissolve out impurities, filtering the resulting slurry, stripping the filtrate and recovering the ammonia therefrom, and evaporating the water from the stripped filtrate to recover its content of solid material.

6. A process for the manufacture of melamine which comprises the steps of heating a member of the group consisting of cyanamide and dicyandiamide and a solvent comprising liquid ammonia in an autoclave until a melamine product has been formed, discharging the contents of the autoclave directly into a body of water, filtering the resulting slurry and washing the melamine with water, and discharging into the wash water another batch of melamine product from the autoclave.

VICTOR L. KING.